March 31, 1970     C. D. LISTER     3,503,470

INTERMITTENT LUBRICANT SPRAY DEVICE

Filed Aug. 4, 1967

United States Patent Office 3,503,470
Patented Mar. 31, 1970

3,503,470
INTERMITTENT LUBRICANT SPRAY DEVICE
Cyril Douglas Lister, Mill Lane, Caunton,
Newark, Nottinghamshire, England
Filed Aug. 4, 1967, Ser. No. 658,476
Claims priority, application Great Britain, Aug. 12, 1966, 36,172/66
Int. Cl. F16n 7/34; F01m 1/08
U.S. Cl. 184—55                                10 Claims

ABSTRACT OF THE DISCLOSURE

A device for delivering a charge of lubricant at intervals e.g., as when lubricating the links of a conveyor chain, is provided with an air spray device having a suction connection to a lubricant conduit. A valve chest with an air passage connects the spray device with a source of air under pressure and a control valve in the air passage operable at predetermined intervals, e.g., by successive links of the conveyor chain, to cause a blast of air to pass through the spray device to operate the suction connection whereby a quantity of lubricant is entrained in the blast of air issuing from the spray device.

---

Figure 1:
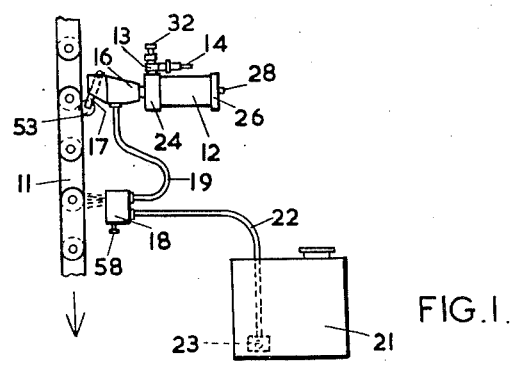

This invention relates to lubricating devices of the kind in which a charge of lubricant is delivered at intervals to an intermittently operable air spray device for entrainment in the air spray produced by the device.

According to the present invention, a lubricating device of the kind referred to comprises an air chamber adapted to receive air under pressure, an air-flow regulator valve arranged between the air chamber and the source of air under pressure, an air spray device formed with a suction connection for attachment to a lubricant conduit, a valve chest formed with an air passage having an outlet conduit connected to the air chamber and an outlet conduit connected to the air spray device, a control valve movably mounted in the valve chest and adapted to open and close the air passage, the control valve being yieldably urged towards its closed position, and means for actuating the control valve at predetermined intervals to connect the air chamber with the spray device so as to cause a blast of air to pass through the spray device to operate the suction connection whereby a quantity of lubricant is entrained in said blast of air.

Two or more spray devices may be provided and arranged, for example, in tandem and served by a common air outlet conduit, the air chamber being of a size appropriate to the volume of blast required simultaneously at the two or more nozzles. In such a case, the spray devices may be similar in construction, each being provided with a suction connection for attachment to a lubricant conduit.

To avoid the need for excessive suction, e.g., in the case of a lubricant conduit with a substantial lift, there is preferably arranged in the suction connection or the lubricant conduit a non-return valve. The amount of lubricant supplied at each blast is also preferably controlled by a valve in the suction line.

In a preferred embodiment, the device is not provided with a permanent reservoir for lubricant, the latter being provided by the cans in which the lubricant is obtainable commercially, e.g., the usual 1-gallon cans. In such a case, the lubricant conduit may consist of a flexible pipe simply inserted into the lubricant in the container, the non-return valve being a simple ball valve in the free end of the pipe.

The control valve may be in the form of an annular face spring-loaded into engagement with a valve seat formed by an annular step in the air passage and providing access via the passage betwen the inlet and outlet conduits, and the valve-actuating means may be a slidable plunger arranged in the valve chest and arranged, upon actuation, to move the valve off its seat against the action of the spring, the plunger being actuated at intervals by a roller carried by a pivoted arm adapted to be engaged intermittently by a movable portion of the apparatus required to be lubricated, e.g., a portion of a chain conveyor the links of which are arranged to be sprayed by the lubricating device. In a convenient arrangement, the valve face is constituted by one side of an annular flange formed on the slidable plunger.

The air chamber is preferably variable in volume, e.g., by the provision of an adjustable end wall, and in order to provide against a continuous spray issuing from the spray device, e.g., in the event that the control valve is held in the open position for any reason, the regulator valve is adjusted to provide an air flow rate which itself is insufficient to produce a spray from the spray device.

Such an adjustable wall is conveniently provided by a piston spring-loaded against the air pressure entering the chamber, and in such a case, adjustment may be provided by a piston rod guide tube threaded into a supporting wall, the end face of the tube forming an abutment limiting the movement of the piston under the air pressure.

The lubricating device has been found particularly useful in the lubrication of the link pivots of a conveyor chain, the pivoted arm mentioned above being operated by engagement with a portion of the chain at intervals to engage the plunger of the control valve to cause a blast of air from the air chamber to pass through the valve into the spray device as described above, the spray device being provided with a nozzle for directing the spray on to the link pivots. After each operation of the valve, the air chamber is re-charged by the build-up of pressure from the regulator valve until it reaches the same pressure as that of the compressed air supply line, in this example, 45 lbs. per square inch, the build-up taking place during the movement of the conveyor over the distance between the points to be lubricated.

The lubricating device according to the present invention lends itself to simplicity in construction and economical in manufacture.

Figure 2:
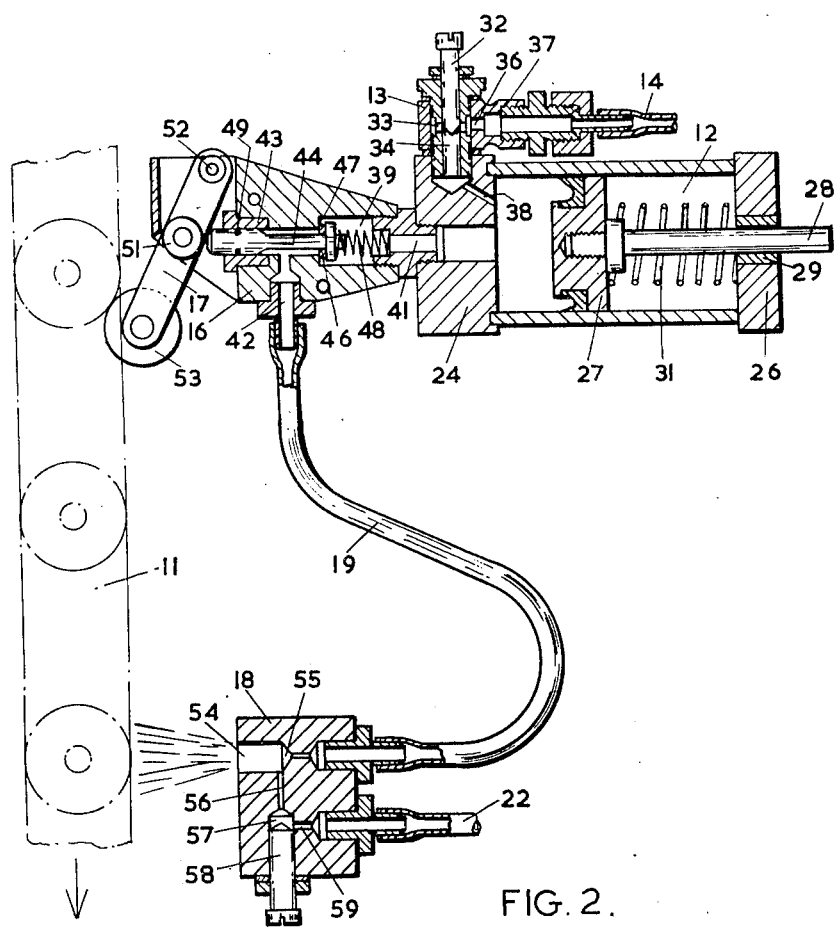

By way of example, the invention will now be described in greater detail with reference to the accompanying drawings, in which FIGURE 1 is a diagrammatic illustration of a lubricating device according to the invention, and FIGURE 2 is a cross-sectional view of the device.

The device is suitably mounted adjacent one run 11 of a conveyor chain of block link type and consists essentially of an air chamber 12, an air flow regulator valve 13 between the chamber 12 and a source 14 of air under pressure, a valve chest 16, a valve operating lever 17, an air spray head 18, an outlet pipe 19 extending from the valve chest 16 to the spray head 18, a lubricant container 21 and a suction conduit 22 extending from the spray head 18 into the container 21 and provided with a non-return ball valve 23.

The air chamber 12 is cylindrical in form and is provided with inner and outer end caps 24 and 26, respectively, between which is arranged an air piston 27 having a guide rod 28 extending through a bushing 29 in the end cap 26, the piston being urged inwardly by a spring 31. The regulator valve 13 is inserted into the end cap 24 and is provided with a screwed stem 32 by which air flow can be regulated, the end of the stem 32 being arranged to pass across a series of apertures 33 breaking into the screwed bore 34 of the valve 13 and connecting the bore 34 to an air inlet 36 formed in an adaptor 37 by which the valve 13 is connected to the source 14 of air under pressure. The valve bore 34 is connected to the interior of the air chamber 12 by a passage 38 formed in the end cap 24.

The valve chest 16 is formed with an air passage 39 having an inlet conduit 41, connected to the air chamber 12, an outlet conduit 42 connected to the outlet pipe 19. Slidably mounted in a guide bush 43 in the valve chest 16 is a control valve 44 extending into the passage 39 and formed with a seating ring 46 arranged to seat on an annular face 47 formed in the passage 39, the valve being continuously urged into contact with the face 47 by a spring 48. The valve 44 is provided with a sealing ring 49 and extends from the end of the bush 43 to form a tappet for engagement by a roller 51 carried by the lever 17, the latter being pivoted at 52 in the valve chest 16 and carrying an operating roller 53 arranged to ride between the outer links of the chain 11 to be engaged by the leading end of each successive inner link of the chain 11, in turn, which causes the lever 17 to pivot so that the roller 51 depresses the valve 44 to open the passage 39.

The spray head 18 is formed with a spray nozzle 54 containing a Venturi passage 55 into which breaks a transverse suction passage 56 leading to the screwed bore 57 of a flow regulator valve 58, the outlet pipe 19 leading to the Venturi passage 55. The bore 57 communicates with the suction conduit 22 by means of a passage 59.

In operation, air under pressure is fed at a controlled rate through the valve 32, 34 to the air chamber 12 in which it builds up to the pressure in the supply conduit 14, e.g., 45 lbs., per square inch, the build-up taking place during movement of the conveyor 11 over the distance between the points to be lubricated, i.e., the conveyor link pins. As each inner link of the chain engages the roller 53, the valve 44 is moved off its seat to open the passage 39 upon which a blast of air is caused to pass into the Venturi passage 55 thus causing a charge of lubricant to be sucked from the conduit 22 and entrained in the spray of air issuing from the nozzle 34 as a result of the action of the Venturi passage 55.

I claim:

1. A lubricating device of the kind referred to, comprising an air chamber, conduit means connecting said chamber to a source of air under pressure, an air flow regulator valve in said conduit, a lubricant source, an air spray device, a suction conduit connecting said air spray device to said lubricant source, a valve chest formed with an air passage having an inlet conduit connected to the air chamber and an outlet conduit connected to the air spray device, a control valve mounted in the valve chest and movable to open and close the air passage, the control valve including an annular face yieldably urged towards a closed position, and a slidable plunger extending from said annular face for actuating the control valve at predetermined intervals to connect the air chamber with the spray device so as to cause a blast of air to pass through the spray device to operate the suction connection whereby a quantity of lubricant is entrained in said blast of air.

2. A lubricating device as in claim 1, wherein the annular face is spring-loaded into engagement with a valve seat formed by an annular step in the air passage and providing access via the passage between the inlet and outlet conduits.

3. A lubricating device as in claim 1, wherein the slidable plunger is formed integrally with the annular face and extends from the valve chest.

4. A lubricating device as in claim 1, further comprising a pivoted arm carrying a roller adapted upon pivotal movement of the arm to cause depression of the plunger.

5. A lubricating device as in claim 4, wherein the pivoted arm carries an operating roller arranged to be engaged intermitently by a movable portion of the apparatus to be lubricated.

6. A lubricating device as in claim 1, wherein the air chamber is variable in volume by the provision of an adjustable wall.

7. A lubricating device as in claim 6, wherein the adjustable wall is provided by a piston spring-loaded against the pressure air entering the air chamber.

8. A lubricating device as in claim 1, further comprising at least two spray devices served by a common air outlet conduit.

9. A lubricating device as in claim 1, further comprising a non-return valve in the suction conduit.

10. A lubricating device as in claim 9, wherein the suction conduit consists of a flexible pipe simply inserted into the lubricant in a container, the non-return valve being a simple ball valve inserted into the free end of the pipe.

References Cited

UNITED STATES PATENTS

| 3,071,209 | 1/1963 | Friedell et al. | 184—55 |
| 3,131,869 | 5/1964 | Vega et al. | 184—55 XR |
| 3,031,033 | 4/1962 | Burrows | 184—15 |
| 3,073,415 | 1/1963 | Dutton et al. | 184—15 |

FOREIGN PATENTS

| 971,186 | 6/1950 | France. |
| 868,472 | 5/1961 | Great Britain. |

MARK M. NEWMAN, Primary Examiner

MANUEL A. ANTONAKAS, Assistant Examiner

U.S. Cl. X.R.

184—15